US008066432B2

(12) United States Patent  (10) Patent No.: US 8,066,432 B2
Yang et al.  (45) Date of Patent: Nov. 29, 2011

(54) TEMPERATURE SENSITIVE FILMS

(75) Inventors: Huimin Yang, Milwaukee, WI (US);
Liping Guo, Milwaukee, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 490 days.

(21) Appl. No.: 12/363,929

(22) Filed: Feb. 2, 2009

(65) Prior Publication Data

US 2010/0192833 A1 Aug. 5, 2010

(51) Int. Cl.
*G01K 11/12* (2006.01)
*G01K 11/06* (2006.01)
(52) U.S. Cl. ........................................ 374/162; 374/106
(58) Field of Classification Search ................. 374/106, 374/161, 162; 116/216, 217, 219
See application file for complete search history.

(56) References Cited

U.S. PATENT DOCUMENTS

| | | | |
|---|---|---|---|
| 3,065,083 A | 11/1962 | Gessler | |
| 3,465,590 A | 9/1969 | Kluth et al. | |
| 3,521,489 A | 7/1970 | Finkelstein et al. | |
| 3,665,770 A | 5/1972 | Sagi et al. | |
| 3,946,612 A | 3/1976 | Sagi et al. | |
| 4,154,106 A | 5/1979 | Inoue et al. | |
| 4,248,089 A | 2/1981 | Heinmets | |
| 4,362,645 A | 12/1982 | Hof et al. | |
| 4,428,321 A | 1/1984 | Arens | |
| 4,629,330 A | 12/1986 | Nichols | |
| 4,743,557 A | 5/1988 | Tiru et al. | |
| 4,753,188 A | 6/1988 | Schmoegner | |
| 5,152,611 A | 10/1992 | Pieper et al. | |
| 5,340,537 A | 8/1994 | Barrett | |
| 5,622,137 A | 4/1997 | Lupton, Jr. et al. | |
| 5,779,364 A | 7/1998 | Cannelongo et al. | |
| 6,055,786 A * | 5/2000 | Hubbard et al. | 116/216 |
| 6,244,208 B1 | 6/2001 | Qiu et al. | |
| 6,382,125 B1 * | 5/2002 | Tamura | 116/207 |
| 6,420,184 B1 | 7/2002 | Hof | |
| 6,561,122 B1 * | 5/2003 | Kurja et al. | 116/216 |
| 6,564,742 B2 | 5/2003 | Perner et al. | |
| 6,727,317 B2 * | 4/2004 | Kurja et al. | 116/216 |
| 6,786,638 B1 | 9/2004 | Bonds et al. | |
| 7,063,041 B2 | 6/2006 | Odashiro | |
| 7,343,872 B2 | 3/2008 | Taylor et al. | |
| 7,429,414 B2 | 9/2008 | Nagae | |
| 2007/0256792 A1 | 11/2007 | Reading et al. | |
| 2007/0280331 A1 | 12/2007 | Lin | |
| 2008/0232427 A1 | 9/2008 | Leute et al. | |
| 2009/0010306 A1 * | 1/2009 | Egami et al. | 374/161 |
| 2010/0247900 A1 * | 9/2010 | Parker et al. | 428/327 |

FOREIGN PATENT DOCUMENTS

| | | | |
|---|---|---|---|
| JP | 01112123 A * | 4/1989 | |
| JP | 10122982 A * | 5/1998 | |
| JP | 10197363 A * | 7/1998 | |
| JP | 2005291825 A * | 10/2005 | |
| JP | 2006133190 A * | 5/2006 | |
| JP | 2009204573 A * | 9/2009 | |
| JP | 2010107397 A * | 5/2010 | |
| WO | WO 2007082984 A1 * | 7/2007 | |

* cited by examiner

*Primary Examiner* — R. A. Smith
(74) *Attorney, Agent, or Firm* — Whyte Hirschboeck Dudek SC

(57) ABSTRACT

Temperature-sensitive films that undergo an irreversible change in appearance when the films are heated to a threshold temperature are provided. Also provided are methods for indicating that an object in thermal contact with a temperature-sensitive film has reached a threshold temperature.

14 Claims, 1 Drawing Sheet

TEMPERATURE SENSITIVE FILMS

FIELD OF THE INVENTION

The present invention relates to temperature-sensitive films that undergo an irreversible change in appearance upon reaching a threshold temperature. The present invention further relates to adhesive tapes and labels made from the films, and to methods of using the films to indicate that an object has reached the threshold temperature.

BACKGROUND OF THE INVENTION

Thermochromic technologies are commonly employed to monitor temperature changes because of their easy visual detection. Thermochromic technologies generally fall into two categories: reversible and irreversible. Reversible thermochromic technologies include encapsulated thermochromic dye-based systems. Thermochromic dyes are robust temperature indicating systems that are used in many applications. These dyes can be contained in printing inks and extruded plastic parts. Most thermochromic dye-based systems include microencapsulated mixtures of chemicals that are highly colored in the cool state. When the chemical is heated, a reversible reaction occurs that bleaches the system, rendering it colorless. The color returns when the system is cooled. Another reversible thermochromic technology is based on liquid crystals (LC). A LC has strong light reflection at a temperature between a low (crystalline) and a high (isotropic) temperature state. As the temperature of the LC is raised from the low temperature to the high temperature, the color of the liquid crystal goes from the background black, through the spectral colors, and back to black. Upon cooling, this color sequence is reversed.

In many applications, it is highly desirable to have a permanent record when the temperature of an object exceeds a threshold temperature. For example, it may be useful to know if a system has overheated, particularly if the overheating was temporary. During the operation of electrical equipment, overheating caused by loose connections or spikes of current/voltage is a common cause of failure. Equipment which can experience overheating includes cable trays, switchboards, and motor control centers. If overheating is caught early, serious damage (fire, explosion, machine shut down, etc.) to equipment and personal injury can be avoided. However, without continuous monitoring, reversible temperature indicating technology can fail to alert personnel to a temporary overheating. Therefore, an irreversible temperature-indicating method is desirable.

Some irreversible temperature indicating methods use an indicator substrate below a solid substance. In these methods, the indicator substrate becomes visible when the solid substance becomes transparent upon melting.

U.S. Pat. No. 5,152,611 describes an article coated with an opaque composition composed of an organic polymer and a bonding agent. When the melting point of the composition is reached, the material melts and becomes transparent or translucent and the color of the article shows through.

U.S. Pat. No. 5,622,137 describes a temperature sensor that includes a substrate having a colored patch obscured by a thermochromic material. When the material is exposed to a predetermined temperature, it changes to a relatively transparent color whereby the colored patch on the substrate is rendered visible through the thermochormic material.

U.S. Pat. No. 5,779,364 describes a temperature indicator that utilizes waxes, low-temperature melt metals or polymers attached to a support member that will melt to reveal a visible indicia on the support surface, thereby serving as an indicator that the product to which the indicator has been attached has been heated beyond a predetermined temperature.

U.S. Pat. No. 7,063,041 describes a temperature sensitive label having a waxed layer that comprises a powdered petroleum wax formed on the face of a colored paper and covered with a transparent film. When the temperature of an apparatus to which the label is affixed reaches a preset temperature the wax melts and the wax layer becomes translucent.

Unfortunately, achieving a dramatic contrast between the opacity of the solid substances and the transparency of the melted substances in existing temperature indicating films has proven challenging. In addition, known temperature indicating films may not be sufficiently flexible or elastic to be stretched and applied to irregular surfaces.

BRIEF SUMMARY OF THE INVENTION

One aspect of the invention provides a temperature-sensitive film comprising: (a) a colored backing layer; and (b) a temperature-sensitive layer disposed over the backing layer. The temperature-sensitive layer comprises: (i) a binder; (ii) a set of lower-melting light-scattering particles dispersed in the binder, the lower-melting light-scattering particles having a melting point at or near a threshold temperature, such that they melt and transparentize at the threshold temperature; and (iii) a set of higher-melting light-scattering particles dispersed in the binder, the higher-melting light-scattering particles having a melting point above the threshold temperature; wherein the transparency of the temperature-sensitive layer and the visibility of the colored backing layer are irreversibly increased at the threshold temperature.

In one embodiment of the temperature-sensitive film the temperature-sensitive layer is initially opaque below the threshold temperature and transparent after the threshold temperature has been reached. The temperature-sensitive film can have an initial Y-value (lightness) of at least 40 prior to the melting of the lower-melting light-scattering particles and a Y-value that differs by less than 2 from the Y-value of the colored backing layer in the absence of the temperature-sensitive layer after the lower-melting light-scattering particles have melted.

In one embodiment of the temperature-sensitive film the temperature-sensitive layer comprises about 20 to 45 wt. % binder, about 40 to 65 wt. % lower-melting light-scattering particles and about 5 to 20 wt. % higher-melting light-scattering particles, based on the solids content of the temperature-sensitive layer.

In one embodiment of the temperature-sensitive film the threshold temperature is 150° C. or lower.

In one embodiment of the temperature-sensitive film the lower-melting light-scattering particles comprise at least one wax.

In one embodiment of the temperature-sensitive film the higher-melting light-scattering particles comprise an inorganic oxide, such as silica. In this embodiment, the lower-melting light-scattering particles can comprise a wax. In this embodiment, the temperature-sensitive layer can comprise about 20 to 45 wt. % binder, about 40 to 65 wt. % lower-melting light-scattering particles and about 5 to 20 wt. % higher-melting light-scattering particles. In this embodiment the threshold temperature can be 150° C. or lower.

In one embodiment of the temperature-sensitive film the binder comprises a thermoplastic elastomer.

In one embodiment of the temperature-sensitive film the colored backing layer comprises a polymeric film. An adhesive coating may optionally be included on the colored backing layer.

Another aspect of the invention provides a method of indicating that an object has reached a threshold temperature using a heat sensitive film, the film comprising: (a) a colored backing layer; and (b) a temperature-sensitive layer disposed over the backing layer. The temperature-sensitive layer comprises: (i) a binder; (ii) a set of lower-melting light-scattering particles dispersed in the binder, the lower-melting light-scattering particles having a melting point at or near the threshold temperature, such that they melt and transparentize at the threshold temperature; and (iii) a set of higher-melting light-scattering particles dispersed in the binder, the higher-melting light-scattering particles having a melting point above the threshold temperature; the method comprising placing the temperature-sensitive film in thermal contact with the object and observing an increase in the visibility of the colored backing layer after the temperature of the object reaches the threshold temperature.

Yet another aspect of the invention provides a temperature-sensitive film comprising: (a) a colored backing layer comprising a flexible plastic film; and (b) a temperature-sensitive layer disposed over the backing layer. The temperature-sensitive layer comprises: (i) a binder comprising a thermoplastic elastomer; and (ii) a set of light-scattering particles dispersed in the binder, the light-scattering particles having a melting point at or near a threshold temperature, such that they melt and transparentize at the threshold temperature; wherein the transparency of the temperature-sensitive layer and the visibility of the colored backing layer are irreversibly increased at the threshold temperature.

In one embodiment of this aspect, the temperature-sensitive layer comprises about 25 to about 45 wt. % binder and about 55 to about 75 wt. % light-scattering particles, based on the solids content of the temperature-sensitive layer.

The light scattering particles can comprise a wax. The binder can comprise a polyurethane or a polyester.

Also provided is a method of indicating that an object has reached a threshold temperature using a temperature-sensitive film, the film comprising: (a) a colored backing layer comprising a flexible plastic film; and (b) a temperature-sensitive layer disposed over the backing layer, the temperature-sensitive layer comprising: (i) a binder comprising a thermoplastic elastomer; and (ii) a set of light-scattering particles dispersed in the binder, the light-scattering particles having a melting point at or near a threshold temperature, such that they melt and transparentize at the threshold temperature; the method comprising placing the temperature-sensitive film in thermal contact with the object and observing an increase in the visibility of the colored backing layer after the object reaches the threshold temperature.

DETAILED DESCRIPTION OF THE PREFERRED EMBODIMENT

Figure 1A:
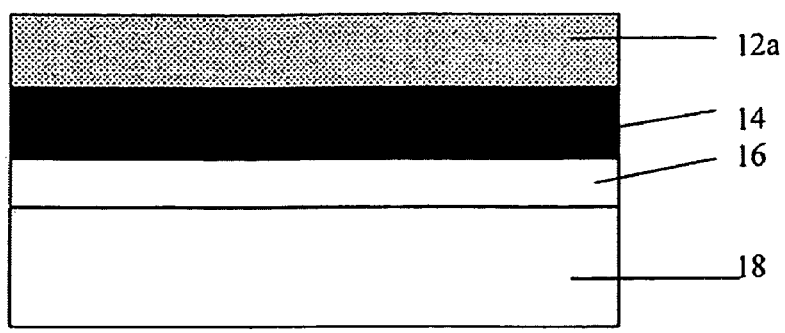
FIG. 1(a) shows a temperature-sensitive film on an object, wherein the temperature of the object is initially below a threshold temperature.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property or process parameter, such as, for example, particle size, temperature, luminance, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

The term "comprising" and its derivatives are not intended to exclude the presence of any additional component, step or procedure, whether or not the same is specifically disclosed. In order to avoid any doubt, any process or composition claimed through use of the term "comprising" may include any additional steps, equipment, additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

One aspect of the invention provides temperature-sensitive films that undergo an irreversible change in appearance when the films are heated to a threshold temperature. Another aspect of the invention provides a method for indicating that an object in thermal contact with a temperature-sensitive film has reached a threshold temperature. Both aspects of the invention are described below in conjunction with the non-limiting embodiment depicted in FIGS. 1(a) and (b).

Figure 1B:
FIG. 1(b) shows the temperature-sensitive film of FIG. 1(a) after the object has reached the threshold temperature.
Figure 1B:
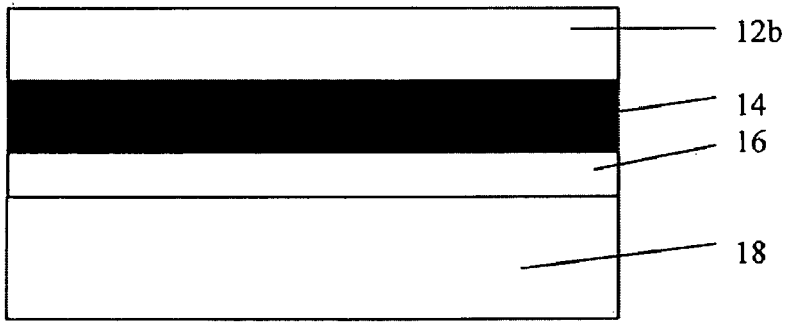

FIG. 1 shows an embodiment of a temperature-sensitive film which changes appearance at a threshold temperature as a result of an increase in the transparency of a temperature-sensitive layer. The increased transparency results in an increased visibility of an underlying colored backing layer which provides an observable indication that the threshold temperature has been reached.

The temperature-sensitive film 10 of this embodiment includes a temperature-sensitive layer 12a that is initially sufficiently opaque to at least partially obscure the colored backing layer. The temperature-sensitive layer 12a is desirably, but not necessarily, initially completely opaque, such that the colored backing layer 14 is completely obscured. However, the temperature-sensitive layer 12a initially may have only partial opacity sufficient to substantially obscure the underlying colored backing layer 14. For example, the temperature-sensitive layer 12a may be cloudy rather than completely opaque. Similarly, the temperature-sensitive layer 12b is desirably, but not necessarily, completely transparent after the threshold temperature has been reached, such that the colored backing layer 14 is completely visible. However, the temperature-sensitive layer 12b may have only partial transparency at the threshold temperature, such that the colored backing layer 14 becomes substantially visible at the threshold temperature. The temperature-sensitive film may optionally include an adhesive coating 16 on a surface of the colored backing layer 14. The temperature-sensitive films can be quite thin. In some embodiments the temperature-sensitive films have a thickness of no greater than about 350 microns.

The temperature-sensitive layer may be placed in thermal contact (e.g., direct contact) with an object of interest 18 (FIG. 1(a)). When the temperature of the object 18 reaches the threshold temperature of the temperature-sensitive layer, an observable increase in the visibility of the colored backing layer can be observed (FIG. 1(b)).

Temperature-Sensitive Layers

The temperature-sensitive layer includes a set of lower-melting light-scattering particles and, optionally, a set of higher-melting light-scattering particles in a binder. In some embodiments of the present films, the combination of lower-melting light-scattering particles and higher-melting light scattering particles in the temperature-sensitive layer can provide a temperature-sensitive layer having both high opacity prior to reaching its threshold temperature and high transparency after reaching its threshold temperature.

The initial opacity of the temperature-sensitive layer can be attributed, at least in part, to light scattering from the higher-melting light-scattering particles. Therefore, the optimal size distribution of the higher-melting light-scattering particles depends on the nature of the wavelengths of the light to be scattered. For example, in a typical case where visible light scattering is to be observed, the higher-melting light-scattering particles will include particles having diameters in the range of about 0.1 to about 10 microns. This includes embodiments where the diameters range from about 0.1 to about 1 micron.

The higher-melting light-scattering particles have a melting temperature above the threshold temperature of interest, such that they remain in the solid form at the threshold temperature. The higher-melting light-scattering particles desirably have a melting temperature above any temperature that is likely to be achieved by the films during use. Thus, in some embodiments, the higher-melting light-scattering particles can have melting temperatures that are at least 100° C., at least 500° C., or even at least 1000° C. higher than the threshold temperature. Inorganic oxide particles that appear transparent to visible light, such as silicon dioxide (silica), are suited for use as the higher-melting light-scattering particles.

Light scattering from the lower-melting light-scattering particles also contributes to the initial opacity of the temperature-sensitive film. Therefore, the optimal size distribution of the lower-melting light-scattering particles will also depend on the nature of the wavelengths of the light to be scattered. For example, in a typical case where visible light scattering is to be observed, the lower-melting light-scattering particles will include particles having diameters in the range of about 0.1 to about 10 microns. This includes embodiments where the diameters range from about 0.1 to about 1 microns.

The lower-melting light-scattering particles have a melting temperature at or near the threshold temperature of interest, such that they melt and transparentize at the threshold temperature. The phrase 'near the threshold temperature' is used in recognition of the fact that some materials may have a melting temperature range, rather than a single sharp melting temperature. Therefore, lower-melting light-scattering particles can be considered to have a melting temperature 'at or near a threshold temperature' if that threshold temperature lies within the melting temperature range for those particles.

The composition of the lower-melting light-scattering particles will depend on the threshold temperature of interest. For many practical applications, such as determining whether perishable goods have achieved a threshold temperature or whether a piece of electronic equipment has overheated, the threshold temperature can be about 200° C. or lower. This includes embodiments where the threshold temperature is about 150° C. or lower and further includes embodiments where the threshold temperature is about 100° C. or lower. Lower-melting light-scattering particles that include, or are made of, one or more waxes, such as paraffin and Carnauba wax, are examples of suitable lower-melting light-scattering particles for such applications. Other materials that can be used include, but are not limited to, organic compounds such as fatty acids (e.g., stearic acid, tetracosane, palmitic acid, or combinations thereof).

In order to maximize the contrast between the initial opaque state of the temperature-sensitive layer and the final transparent state of the temperature-sensitive layer, it may be desirable to select materials for the higher-melting and lower-melting light-scattering particles that have the same, or substantially the same, indices of refraction at the light-scattering wavelengths of interest. For the purposes of this disclosure, materials can be considered to have substantially the same indices of refraction if they differ by no more than 0.05. However, index matching is not a critical feature of the present films and in some embodiments, the indices of refraction of the higher-melting and lower-melting light scattering particles differ significantly (e.g., by $\geq 0.1$).

Binders:

The binder in the temperature-sensitive layer can be a polymer in which the lower-melting and, if present, higher-melting light-scattering particles can be dispersed and which is sufficiently transparent that it does not obscure the opaque-to-transparent transition of the temperature-sensitive layer. Suitable examples include thermoplastic elastomers, such as polyester-based polyurethane thermoplastic elastomers and polyester resins. Thermoplastic elastomers are well-suited for applications where a flexible temperature-sensitive film is desired because they allow the film to be stretched, cut and/or applied to irregular surfaces while remaining intact.

The binder is typically a major component of the temperature-sensitive layer, accounting for at least about 20 weight percent (wt. %) of the layer, based on the solids content of the layer. In some embodiments, the temperature-sensitive layer includes at least 30 wt. % binder, based on the solids content of the layer. This includes embodiments where the temperature-sensitive layer includes at least 35 wt. % binder, based on the solids content of the layer.

The relative amounts of binder to light-scattering particles in the temperature-sensitive layers, and the relative amounts of the lower-melting and higher-melting light scattering particles may vary. For example, in some embodiments, the ratio of light-scattering particles to binder is about 1.5:1 to about 2.5:1. The ratio of lower-melting light-scattering particles to higher-melting light-scattering particles can be, for example, about 2.5:1 to about 6:1.

By way of illustration only, specific embodiments of the temperature-sensitive layers can include about 20 to 45 wt. % binder, about 40 to 65 wt. % lower-melting light-scattering particles and about 5 to 20 wt. % higher-melting light-scattering particles, based on the solids content of the temperature-sensitive layer. This includes embodiment wherein the temperature-sensitive layers include about 25 to 40 wt. % binder, about 45 to 60 wt. % lower-melting light-scattering particles and about 10 to 15 wt. % higher-melting light-scattering particles, based on the solids content of the temperature-sensitive layer.

The temperature-sensitive layer can be applied to a colored backing layer by coating a mixture of the light-scattering particles and the binder in a suitable solvent, applying the solution to the surface of the colored backing layer, and drying the coating. Polar solvents, such as 1,3-dioxolane or methyl ethyl ketone (COK), are will suited for use as the solvent. The resulting temperature-sensitive layer can be quite thin. In some embodiments, the temperature-sensitive layer has a thickness of no greater than 100 microns. This includes embodiments where the temperature-sensitive layer has a thickness of no greater than 50 microns.

The contrast between the initial opaque state of the temperature-sensitive layer and its transparent state after reaching the threshold temperature can be dramatic. This contrast can be quantified by measuring the luminance (Y-value component of the Commission on Illumination (CIE) Yxy color space; sometimes referred to as lightness) of the temperature-sensitive film before and after reaching the threshold temperature. In some embodiments, the initial luminance of the temperature sensitive layer in its initial opaque state corresponds to a Y-value of at least 40, using a D65 lightsource with a 2°-observer angle. This includes embodiments in which the temperature-sensitive layer has an initial Y-value of at least 55 and further includes embodiments in which the temperature-sensitive layer has an initial Y-value of at least 65. After achieving the threshold temperature, the Y-value of the temperature-sensitive film will reflect the luminance of the colored backing layer. Thus, after the temperature-sensitive film has reached the threshold temperature, the Y-value for the film in the presence of the temperature-sensitive layer can be compared to the Y-value for the colored-backing layer measured in the absence of the temperature-sensitive layer. In some embodiments, after reaching the threshold temperature the temperature-sensitive films have a Y-value that differs by less than 2 from the Y-value of the colored backing layer measured in the absence of the temperature-sensitive layer. This includes embodiments in which, after reaching the threshold temperature, the temperature-sensitive films have a Y-value that differs by less than 1 from the Y-value of the colored backing layer measured in the absence of the temperature-sensitive layer.

Colored Backing Layers

The temperature-sensitive layer is disposed over a colored backing layer 14. The colored backing layer provides a colored background that becomes visible (or more visible) through the temperature-sensitive layer at the threshold temperature. The colored-backing layer may be any color that contrasts with the color of the temperature-sensitive layer in its initial opaque state. For example, if the temperature-sensitive layer is initially an opaque white layer, the colored backing layer preferably provides a dark colored background for maximum contrast. The colored backing layer may be composed of a colored material or may have a colored substance (e.g., an ink) coated or printed on a surface thereof. The colored portion of the colored backing layer may take the form of indicia or markings (e.g., letters, numbers, symbols, etc.) Suitable materials for the colored backing layer include, but are not limited to, flexible polymer films and paper.

The colored backing layer may optionally have an adhesive 16 coated on at least a portion of a surface thereof, such that the temperature-sensitive films can be applied as a tape or label to the surface of an object of interest 18. To protect the temperature-sensitive layer from scratching or to increase its chemical resistance, a thin protective coating, such as a 1 mil clear polyester film, can be used as an over-laminate.

WORKING EXAMPLE

Table 1 provides four exemplary formulations for the temperature-sensitive layers of the present temperature-sensitive films. The melting temperature for each formulation is provided in the final column.

TABLE 1

| Coating Formula | Estane 5703 20%[1] | Vitel 2100B 20%[2] | IGI 8540A 33%[3] | Michem Wax 411 | Microklear 418 | Evonik ACEMATT$^R$ OK 412 | Temperature ±2-3° C.[4] |
|---|---|---|---|---|---|---|---|
| 1 | 11.3 | | | 5 | | 1.2 | 80 |
| 2 | | 13 | 9.1 | | | 1.0 | 88 |
| 3 | | 13 | | | 4 | 1.0 | 80 |
| 4 | 4 | 10 | | 5 | | 1.0 | 79 |

[1]20% in 1,3-dioxolane or 20% in MEK
[2]20% in MEK/toluene (70/30) mixture.
[3]33% in MEK
[4]Temperatures at which a coated sample starts to change color. Measured 24 hours after a sample was heated at this temperature.

Estane® 5703 is a polyester based polyurethane thermoplastic elastomer sold by Novena, Inc. Vitel® 2100B is a polyester resin sold by Bostik. IGI 8540A is a high-vacuum distilled synthetic wax slab sold by International Group, Inc. and having a melting point around 90° C. IGI 8540A is ballmilled with MEK before use. Michem® wax 411 is a wax sold by Michelman. Microklear 418 is a finely micronized 100% Carnauba wax with particle sizes of 6-8 microns and a melting temperature of 81-86° C. Evonik ACEMATT® (Degussa) OK 412 is an amorphous precipitate, wax-coated silica sold by Evonik Industries and having particle sizes of 1-7 microns.

The coating formulations are coated on a polymeric film which can be, for example, a vinyl, polyester, or other film with a dark colored surface. The resulting coating is dried at 50-60° C. for about 1 minute. The dried coatings have a thickness of about 25-75 microns and are a whitish opaque color. The luminance (Y-values) of a film made with coating formula 4 on a green-colored plastic backing layer is measured before and after the temperature-sensitive layer reaches a threshold temperature of 80° C. and the wax particles in the layer melt. The Y-values for the film, measuring with an X-Rite 530 Series Color Reflection Spectrodensitomer with an angle measurement 45°/0° and a visible spectra scope of measurement of 400 nm to 700 nm from X-Rite, Inc., are shown in Table 2.

TABLE 2

| Coating 4 on a Green Backing Layer | Y values |
| --- | --- |
| Before reaching threshold at 80° C. | 67.73 |
| After reaching threshold at 80° C. | 14.42 |
| Green colored backing layer without coating | 14.62 |

The data in Table 2 illustrate the sharp and easily-identifiable appearance change for the temperature-sensitive film before and after the wax particles in the temperature-sensitive film are melted.

It is specifically intended that the present invention not be limited to the embodiments and illustrations contained herein, but include modified forms of those embodiments including portions of the embodiments and combinations of elements of different embodiments as come within the scope of the following claims.

We claim:

1. A temperature-sensitive film comprising:
   (a) a colored backing layer; and
   (b) a temperature-sensitive layer disposed over the backing layer, the temperature-sensitive layer comprising:
      (i) a binder;
      (ii) a set of lower-melting light-scattering particles dispersed in the binder, the lower-melting light-scattering particles having a melting point at or near a threshold temperature, such that they melt and transparentize at the threshold temperature; and
      (iii) a set of higher-melting light-scattering particles dispersed in the binder, the higher-melting light-scattering particles having a melting point above the threshold temperature;
   wherein the transparency of the temperature-sensitive layer and the visibility of the colored backing layer are irreversibly increased at the threshold temperature.

2. The temperature-sensitive film of claim 1, wherein the temperature-sensitive layer is initially opaque below the threshold temperature and transparent after the threshold temperature has been reached.

3. The temperature-sensitive film of claim 1, having an initial Y-value of at least 40 prior to the melting of the lower-melting light-scattering particles and a Y-value that differs by less than 2 from the Y-value of the colored backing layer in the absence of the temperature-sensitive layer after the lower-melting light-scattering particles have melted.

4. The temperature-sensitive film of claim 1, wherein the lower-melting light-scattering particles comprise a wax.

5. The temperature-sensitive film of claim 1, wherein the higher-melting light-scattering particles comprise silica.

6. The temperature-sensitive film of claim 5, wherein the lower-melting light-scattering particles comprise a wax.

7. The temperature-sensitive film of claim 6, wherein the binder comprises a thermoplastic elastomer.

8. The temperature-sensitive film of claim 6, wherein the temperature-sensitive layer comprises about 20 to 45 wt. % binder, about 40 to 65 wt. % lower-melting light-scattering particles and about 5 to 20 wt. % higher-melting light-scattering particles, based on the solids content of the temperature-sensitive layer.

9. The temperature-sensitive film of claim 1, wherein the binder comprises a thermoplastic elastomer.

10. The temperature-sensitive film of claim 9, wherein the colored backing layer comprises a polymeric film.

11. The temperature-sensitive film of claim 9, wherein the threshold temperature is 150° C. or lower.

12. The temperature-sensitive film of claim 1, wherein the temperature-sensitive layer comprises about 20 to 45 wt. % binder, about 40 to 65 wt. % lower-melting light-scattering particles and about 5 to 20 wt. % higher-melting light-scattering particles, based on the solids content of the temperature-sensitive layer.

13. The temperature-sensitive film of claim 1, further comprising an adhesive coating on the colored backing layer.

14. A method of indicating that an object has reached a threshold temperature using a temperature-sensitive film, the film comprising:
   (a) a colored backing layer; and
   (b) a temperature-sensitive layer disposed over the backing layer, the temperature-sensitive layer comprising:
      (i) a binder;
      (ii) a set of lower-melting light-scattering particles dispersed in the binder, the lower-melting light-scattering particles having a melting point at or near the threshold temperature, such that they melt and transparentize at the threshold temperature; and
      (iii) a set of higher-melting light-scattering particles dispersed in the binder, the higher-melting light-scattering particles having a melting point above the threshold temperature;
   the method comprising placing the temperature-sensitive film in thermal contact with the object and observing an increase in the visibility of the colored backing layer after the object reaches the threshold temperature.

* * * * *